United States Patent

Kaasenbrood et al.

[15] 3,674,847

[45] July 4, 1972

[54] PROCESS FOR UREA PRODUCTION IN COMBINATION WITH AMMONIA SYNTHESIS

[72] Inventors: Petrus J. C. Kaasenbrood, Sittard; Petrus J. M. van Nassau, Geleen, both of Netherlands

[73] Assignee: Stamicarbon N.V., Heerlen, Netherlands

[22] Filed: March 17, 1969

[21] Appl. No.: 807,749

[30] Foreign Application Priority Data

March 16, 1968 Netherlands..........................6803775

[52] U.S. Cl............................260/555 A, 23/199, 260/534 R
[51] Int. Cl.......................................................C07c 127/04
[58] Field of Search.....................................260/555, 555 A

[56] References Cited

FOREIGN PATENTS OR APPLICATIONS 6,704,780 10/1967 Netherlands..........................260/555

42/26,770 12/1967 Japan....................................260/555

Primary Examiner—Leon Zitver
Assistant Examiner—Michael W. Glynn
Attorney—Cushman, Darby & Cushman

[57] ABSTRACT

A process for the production of urea from ammonia and carbon dioxide, combined with the preparation of ammonia, is disclosed wherein ammonium carbamate in the urea solution produced is removed from said urea solution by subjecting the urea solution to two stripping stages. The first stripping stage uses the urea synthesis starting gas, which contains hydrogen, nitrogen and carbon dioxide. The second stripping stage, which is at substantially the same pressure as the first stripping stage, uses a gas containing at least one of the components needed in the ammonia synthesis. This second stripping gas is substantially free of ammonia and carbon dioxide. The disclosed process has the advantage, compared to prior processes, that the stripping gases need not be compressed at relatively high temperatures.

6 Claims, 1 Drawing Figure

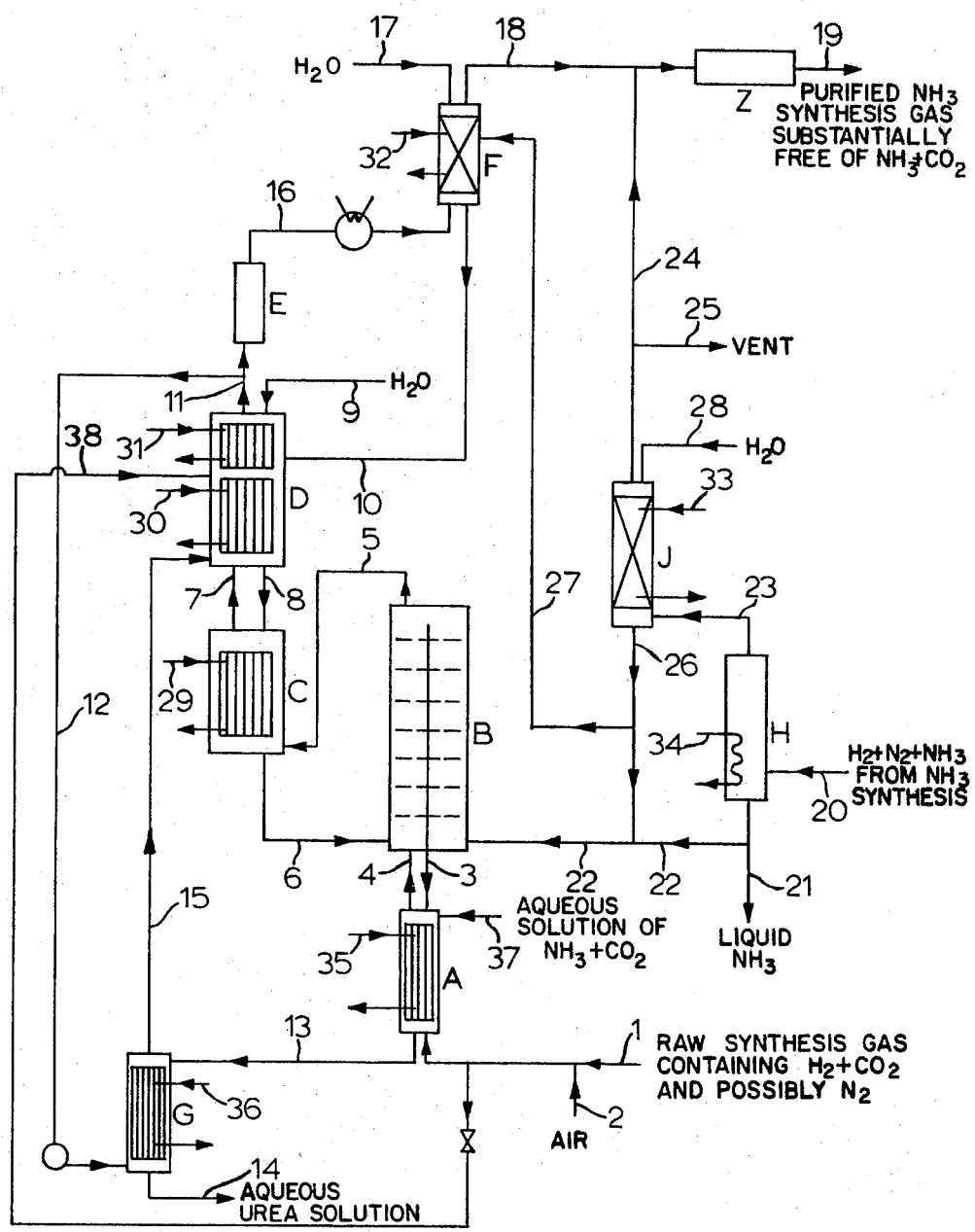

PROCESS FOR UREA PRODUCTION IN COMBINATION WITH AMMONIA SYNTHESIS

It is known that the production of urea from $NH_3$ and $CO_2$ can be combined with the preparation of ammonia, starting from a synthesis gas containing carbon dioxide and hydrogen by first removing the $CO_2$ as an ammonium carbonate or ammonium carbamate solution in a washing zone appertaining to the urea synthesis, which solution is then utilized for the production of urea, and subsequently supplying the gas from which $CO_2$ has been removed to the ammonia synthesis, and returning all, or part, of the ammonia produced to the urea synthesis to be used as a reaction product.

It has also been suggested in such a process that the hydrogen and carbon dioxide containing raw gas mixture needed for the ammonia production should first be utilized for stripping ammonia and carbon dioxide from the urea-containing solution issuing from the urea synthesis, at a high pressure and with input of heat. The ammonia and carbon dioxide are formed from the ammonium carbamate which was not converted to urea.

To ensure complete expulsion or stripping of the ammonia and carbon dioxide, it has been suggested to perform the stripping treatment in two stages, viz a secondary stage in which a previously stripped urea solution is subjected to a stripping operation at relatively low pressure, and a primary stage in which the urea solution is stripped at a high pressure with gas used in the secondary low-pressure stripping treatment.

This procedure has the drawback that the stripping gas, which contains $NH_3$ and $CO_2$, from the low-pressure stage must be compressed at a relatively high temperature, as otherwise solid ammonium carbamate can deposit in the compressor.

Compressing at high temperatures is more expensive, however, and moreover renders the compressors more liable to corrosive attack, so that to avoid this risk, the compressor will have to be made of more expensive, corrosion-resistant material.

The process according to the present invention avoids the undesirable features of the prior art processes by subjecting the ammonium-carbamate-containing urea solution to a stripping treatment effected in two stages at substantially equal pressures, the treatment in the first stage being carried out with the raw gas containing hydrogen and carbon dioxide, and that in the second stage with a gas flow which consists of at least one component, needed for the ammonia synthesis and which is substantially free of ammonia and carbon dioxide.

Stripping gases suitable for use in the secondary stripping stage include for example hydrogen, nitrogen, a hydrogen containing gas obtained by removing $NH_3$ and $CO_2$ from the gas mixture withdrawn from the primary stripping stage or part of the recycle $H_2$-$N_2$ gas stream freed of $NH_3$, which is continuously recycled through the ammonia synthesis.

The stripping treatments are preferably carried out at the urea synthesis pressure, which is also preferably the pressure at which the $NH_3$ and $CO_2$ are combined to form ammonium carbamate, which pressure — in order that heat at a high temperature level can be produced in the carbamate formation — will preferably be 300 atm or above. Generally, the urea synthesis pressure does not exceed 500 atm.

The process of the present invention will now be elucidated with reference to the accompanying drawing, which shows a diagrammatic view of the equipment for the urea synthesis and stripping treatment.

Raw ammonia synthesis gas, consisting substantially of $H_2$, $N_2$ and $CO_2$, and traces of $CH_4$, CO inert gases (A) and $H_2O$, is compressed (not shown) to urea synthesis pressure and is supplied to the base of stripping column A through line 1. Line 2 feeds some air e.g. 2% by volume) to the raw synthesis gas so as to inhibit corrosion of the chromium-nickel urea synthesis installation. This installation consists of a primary stripping column A, a urea reactor B, the ammonium carbamate condensors C and D, a CO-removing unit E, a scrubber F, and the secondary stripping column G with annexed pumps and lines.

In stripping column A, the urea synthesis solution supplied by line 3 passes through a bundle of tubes in countercurrent flow to the infed gas. A large portion of the ammonium carbamate present in the urea synthesis solution in stripping column A is decomposed into $NH_3$ and $CO_2$ and expelled. The heat needed for this purpose is supplied by steam which, delivered through line 35, is passed around the tubes.

The stripping gas laden with $NH_3$ and $CO_2$, flows through line 4 into the liquid reaction mixture in the base of urea reactor B, and subsequently to ammonium carbamate condensor C through line 5. The ammonium carbamate solution formed in condensor C flows through line 6 to urea reactor B. The heat liberated in the ammonium carbamate formation is carried away at a high temperature level by the formation of steam from cooling water in the bundle of tubes therein, water being introduced into the said bundle of tubes through line 29. Uncondensed gases flow through line 7 into the secondary carbamate condensor D, where gaseous $NH_3$ and $CO_2$ still present are as good as completely condensed, to form an ammonium carbamate solution, by addition of, for example, water, or a biuret-containing mother liquor from a urea crystallization, stage through line 9, and a dilute ammonium carbonate solution from scrubber F, through line 10, Liberated heat is carried away in the tube bundles in the upper and lower regions of secondary condensor D, cooling water being supplied to the said bundles through lines 30 and 31 respectively, serving as cooling elements, in which there is a flow of cooling water (boiler feed water may be preheated). From the off gas flow, which has now been stripped of ammonia and carbon dioxide and consists substantially of $H_2$ and $N_2$, a portion equivalent to approximately one-sixth of the total flow is bled off and passes through line 12 to the secondary stripping column G, in which the urea solution supplied from the primary stripping column A through line 13 is subjected to a second stripping treatment to effect further decomposition of remaining carbamate into $NH_3$ and $CO_2$ and removal of these gases. The heat needed for this treatment is supplied in the form of steam through line 36 and fed into the column around the nest of tubes present therein.

The urea solution discharged from column G through line 14 still contains slight amounts of ammonium carbamate and ammonia. Upon expansion (not shown) of the solution to a low pressure, these pass out as gaseous $NH_3$ and $CO_2$, which are absorbed in water (not shown). To enable these additional amounts of $NH_3$ and $CO_2$ to be re-used in the urea process, the primary stripping column A has been provided with a line 37 for recirculation of this solution containing $NH_3$ and $CO_2$.

Stripping gas containing ammonia and carbon dioxide is fed to secundary ammonium carbamate condensor D through line 15. The gas flow from condensor D, which has been freed of $NH_3$ and $CO_2$, passes through CO-removing unit E, in which $O_2$ will combine with $CO_2$ in preference to $H_2$ in the presence of a catalyst at a temperature of about 150°–200° C, and line 16 provided with a cooler to scrubber F, where the $CO_2$ formed in the catalytic oxidation of CO in E is absorbed in water from line 17 and concentrated ammonia water from line 27. To prevent the formation of undesired nitrous gases by oxidation of $NH_3$ in the CO-removing unit E, the gas flow supplied to unit E should be substantially free of $NH_3$. This is achieved by fixing the ammonia present in the gas to ammonium carbamate in the carbamate condensor D, for which purpose some $CO_2$-containing synthesis gas can be supplied through line 38, should this be necessary.

The heat of absorption liberated in scrubber F is carried away by cooling water supplied through line 32.

The $H_2$-$N_2$ gas mixture passed out of scrubber F is fed to unit Z, where it is dried over molecular sieves and freed of remaining traces of CO and $CO_2$. Then the gas is supplied to an ammonia synthesis plant (not shown) through line 19.

A gas containing $NH_3$, $H_2$ and $N_2$ is supplied from the ammonia synthesis plant through line 20. This gas, which already contains some liquid ammonia, is first cooled in condenser H, which acts also as a liquid-gas separator, with the result that a further quantity of the ammonia is transformed into the liquid state. Part of this ammonia is passed out as ammonia product through line 21, while the remainder, needed for the urea production, is fed to urea synthesis reactor B through line 22.

The gas flow, which still contains $NH_3$, passes through line 23 to scrubber J, where the remaining ammonia is washed out with a small quantity of water supplied through line 28. Heat released in this operation is carried away by cooling water supplied by line 33.

The resultant gas, containing $N_2 + H_2$ and freed of $NH_3$, is recycled to the ammonia synthesis via line 24, molecular sieves in unit Z and line 19. In the recycled gas mixture inert gases, present in the raw synthesis gas mixture tend to build up. Their concentration is therefore controlled to a desired extent by bleeding a portion of the circulating gas from the synthesis loop through ventline 25.

The invention will be further elucidated with reference to the following numerical example relating to a urea plant with a capacity of appr. 1,800 metric tons of urea a day operated at a synthesis gas pressure of 350 atmospheres.

The quantities of the reaction components and the products formed from them are given in kilomoles per hour.

Line 1 supplies a gas mixture, obtained by conversion of natural gas, having the following composition:
  4,411 kmoles of $H_2$
  1,265 kmoles of $CO_2$
  1,352 kmoles of $N_2$
  9 kmoles of $H_2O$
  33 kmoles of $CH_4$
  30 kmoles of CO
  14 kmoles of Ar
and line 2
  110 kmoles of $N_2$
  275 kmoles of $O_2$ At a temperature of 100° C this gas mixture from which first a small part containing as main components
  66 kmoles of $H_2$
  19 kmoles of $CO_2$
  20 kmoles of $N_2$
has been bled of through conduit 38 is fed to stripping column A for stripping the urea synthesis solution from urea reactor B, at 190° C and at urea synthesis pressure, the urea synthesis solution consisting of
  1,443 kmoles of urea
  858 kmoles of $CO_2$ (bound as carbamate)
  1,716 kmoles of $NH_3$ (bound as carbamate)
  1,986 kmoles of $NH_3$ (free)
  1,945 kmoles of $H_2O$
and also for stripping the solution supplied from the low-pressure section through line 37, the latter solution containing:
  86 kmoles of $NH_3$
  14 kmoles of $CO_2$ and
  85 kmoles of $H_2O$ From stripping column A a urea solution with a temperature of 150° C and consisting of
  1,415 kmoles of urea
  157 kmoles of $CO_2$ (bound as carbamate)
  314 kmoles of $NH_3$ (bound as carbamate)
  1,854 kmoles of $H_2O$
is fed to stripping column G through line 13.

This solution is stripped at the urea synthesis pressure with stripping gas of 60° C supplied through line 12 and consisting of
  907 kmoles of $H_2$
  301 kmoles of $N_2$
  6 kmoles of $O_2$
  1 kmole of $CO_2$
  6 kmoles of CO
  7 kmoles of $CH_4$
  3 kmoles of Ar
  1 kmole of $H_2O$ A urea solution consisting of
  1,387 kmoles of urea
  1,790 kmoles of $H_2O$
  86 kmoles of $NH_3$
  14 kmoles of $CO_2$ is discharged through line 14.

Urea synthesis reactor B receives an ammonium carbamate solution of appr. 165° C through line 6, the said solution consisting of
  392 kmoles of urea
  1,341 kmoles of $CO_2$ (bound as carbamate)
  2,682 kmoles of $NH_3$ (bound as carbamate)
  818 kmoles of $NH_3$ (free)
  776 kmoles of $H_2O$
and, through line 22, a concentrated ammonia solution (temperature 40° C) having the following composition
  2,514 kmoles of $NH_3$
  113 kmoles of $H_2O$ From line 17 scrubber F receives
  112 kmoles of $H_2O$, and from line 27 concentrated ammonia consisting of
  76 kmoles of $NH_3$
  8 kmoles of $H_2O$
in the form of liquid flows, while a dilute ammonium carbonate solution passes out of column F through line 10 with the following composition
  78 kmoles of $NH_3$
  31 kmoles of $CO_2$
  150 kmoles of $H_2O$ and with a temperature of 60° C, to be used as condensation agent in the second carbamate condensor D.

Through line 9 a urea solution with a temperature of 80° C and a composition of
  92 kmoles of urea
  142 kmoles of $H_2O$
is also supplied as a condensation medium to this carbamate condensor. From the second carbamate condensor D a solution with a temperature of 140° C and a composition of
  92 kmoles of urea
  847 kmoles of $CO_2$ (bound as carbamate)
  694 kmoles of $NH_3$ (bound as carbamate)
  346 kmoles of $NH_3$ (free)
  357 kmoles of $H_2O$
is passed as a condensation agent, to the first carbamate condensor C through line 8.

The gas flow discharged to the ammonia synthesis unit through line 19 consists of
  12,087 kmoles of $H_2$
  4,029 kmoles of $N_2$
  1,353 kmoles of $CH_4$
  574 kmoles of A The flow returning from the ammonia synthesis through line 20 contains
  2,796 kmoles of $NH_3$
  7,893 kmoles of $H_2$
  2,631 kmoles of $N_2$
  1,353 kmoles of $CH_4$
  574 kmoles of A 206 kmoles of ammonia product are discharged through line 21. For washing the ammonia out of the recycling ammonia synthesis mixture, 121 kmoles of washing water are fed to scrubber J through line 28, while
  192 kmoles of $H_2$
  64 kmoles of $N_2$
  33 kmoles of $CH_4$
  14 kmoles of A
are discharged through line 25.

What is claimed is:

1. In a combination process for the preparation of urea and ammonia having a urea preparation stage wherein ammonia, carbon dioxide, and recycled ammonium carbamate are reacted in a urea-synthesis reactor at elevated temperature and pressure to form an aqueous urea reactor solution comprising urea, ammonium carbamate and unreacted ammonia, and wherein the ammonium carbamate in said urea reactor solution is decomposed into ammonia and carbon dioxide, which ammonia and carbon dioxide, along with said unreacted ammonia, are stripped from said urea reactor solution with a synthesis gas containing hydrogen and carbon dioxide, resulting in at least one stripping off-gas stream containing synthesis gas, carbon dioxide and ammonia, and an aqueous urea solution product substantially freed of ammonium carbamate and unreacted ammonia;

and a carbamate condensing stage wherein said at least one stripping off-gas stream from said urea preparation stage is condensed resulting in a synthesis gas substantially free of ammonia and carbon dioxide and an aqueous ammonium carbamate solution, and recycling said aqueous ammonium carbamate solution to said urea-synthesis reactor;

and an ammonia synthesis stage wherein at least a portion of said synthesis gas substantially free of ammonia and carbon dioxide is reacted to form ammonia, at least a portion of such ammonia formed in said ammonia synthesis stage being delivered to said urea-synthesis reactor;

the improvement consisting essentially in providing within said urea preparation stage:

1. a primary stripping stage operated at a high temperature and pressure wherein said urea reactor solution is stripped with a primary stripping gas consisting of said synthesis gas containing hydrogen and carbon dioxide, yielding a first urea solution having a reduced ammonium carbamate and free ammonia content, and a first stripping off-gas containing synthesis gas, carbon dioxide and ammonia, and delivering said first stripping off-gas to said carbamate condensing stage; and, 2. a secondary stripping stage operated at substantially the same pressure level as said primary stripping stage wherein said first urea solution is stripped with a secondary stripping gas, said secondary stripping gas being substantially free of ammonia and carbon dioxide and selected from the group consisting of hydrogen, nitrogen,, or combinations thereof, yielding a second urea solution of further reduced ammonium carbamate and free ammonia content and a second stripping off-gas containing carbon dioxide and ammonia, and delivering said second stripping off-gas to said carbamate condensing stage, wherein ammonia and carbon dioxide are removed from said first and said second stripping off-gases and recycled to said urea synthesis reactor.

2. The process of claim 1 wherein said secondary stripping gas is at least a portion of said synthesis gas substantially free of ammonia and carbon dioxide obtained from said carbamate condensing stage.

3. The process of claim 1 wherein said synthesis gas containing hydrogen and carbon dioxide additionally contains nitrogen.

4. The process of claim 1 wherein said secondary stripping gas comprises essentially hydrogen and nitrogen.

5. The process of claim 1 wherein said primary stripping stage and said secondary stripping stage are carried out at substantially the urea-synthesis pressure.

6. The process of claim 5 wherein said urea-synthesis pressure is at least 300 atmospheres.

* * * * *